(12) United States Patent
Fischer et al.

(10) Patent No.: US 7,803,222 B2
(45) Date of Patent: Sep. 28, 2010

(54) BITUMEN COMPOSITION WITH IMPROVED AGEING RESISTANCE

(75) Inventors: Hartmut Rudolf Fischer, Mierlo (NL); Bart Bos, Vleuten (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 148 days.

(21) Appl. No.: 11/921,275

(22) PCT Filed: Jun. 2, 2006

(86) PCT No.: PCT/NL2006/000275

§ 371 (c)(1),
(2), (4) Date: Mar. 3, 2008

(87) PCT Pub. No.: WO2006/130005

PCT Pub. Date: Dec. 7, 2006

(65) Prior Publication Data

US 2009/0133604 A1    May 28, 2009

(30) Foreign Application Priority Data

Jun. 3, 2005   (EP)   ................... 05076305

(51) Int. Cl.
*C08L 95/00* (2006.01)
(52) U.S. Cl. .............. 106/284.02; 106/284.03
(58) Field of Classification Search ............ 106/284.02, 106/284.03, 277
See application file for complete search history.

(56) References Cited

U.S. PATENT DOCUMENTS

| 2,092,332 | A | | 9/1937 | Plaizier et al. ............... 524/62 |
| 2,531,427 | A | * | 11/1950 | Hauser .......................... 556/9 |
| 3,035,930 | A | | 5/1962 | Talley ..................... 106/284.1 |
| 3,582,367 | A | | 6/1971 | Miller et al. ............. 106/14.36 |
| 4,197,134 | A | * | 4/1980 | Musilli .................... 106/14.11 |
| 4,469,639 | A | * | 9/1984 | Thompson et al. ............ 556/10 |
| 4,474,706 | A | * | 10/1984 | Clay et al. .................. 556/173 |
| 5,407,477 | A | * | 4/1995 | Reynolds et al. ......... 106/284.2 |
| 5,735,943 | A | * | 4/1998 | Cody et al. ............... 106/164.3 |
| 6,225,394 | B1 | | 5/2001 | Lan et al. .................... 524/445 |
| 6,387,996 | B1 | * | 5/2002 | Lan et al. .................... 524/445 |
| 7,066,998 | B2 | * | 6/2006 | Rohrbaugh et al. ...... 106/286.5 |
| 7,582,155 | B2 | * | 9/2009 | Mehta et al. ........... 106/284.01 |

FOREIGN PATENT DOCUMENTS

| GB | 874077 | 8/1961 |
| GB | 982963 | 2/1965 |
| GB | 1 546 564 | 5/1979 |

OTHER PUBLICATIONS

International Search Report for PCT/NL2006/000275, mailed Sep. 5, 2006.

* cited by examiner

*Primary Examiner*—Helene Klemanski
(74) *Attorney, Agent, or Firm*—Nixon & Vanderhye P.C.

(57) ABSTRACT

The invention provides a bitumen composition comprising a bitumen and a modified clay which clay is obtainable by subjecting a clay having a layered structure to a treatment with a compound that is selected from the group consisting of onium compounds having the general formulae $(R_1R_2R_3R_4X)^+$ or $(R_1R_2Y)^+$, wherein X represents N or P, Y represents S, and wherein at least one of $R_1$-$R_4$ represents an aromatic hydrocarbon substituent, a hydroxyl or amino functionalized aliphatic hydrocarbon substituent or a poly(ethyleneoxide) substituent. The invention further provides a process for preparing said bitumen, an asphalt composition comprising aggregate and said bitumen composition, and the use of said bitumen composition in an asphalt composition for road applications.

23 Claims, No Drawings

BITUMEN COMPOSITION WITH IMPROVED AGEING RESISTANCE

This application is the U.S. national phase of International Application No. PCT/NL2006/000275, filed 2 Jun. 2006, which designated the U.S. and claims priority to European Application No. 05076305.1, filed 3 Jun. 2005, the entire contents of each of which are hereby incorporated by reference.

The present invention relates to bitumen compositions, a process for their preparation, the use of them in asphalt compositions and bitumen emulsions for road applications or in bitumen emulsions surface dressing applications, and asphalt compositions and bitumen emulsions comprising said bitumen compositions.

Bitumen is used as a binder in asphalt compositions for road applications. Many road surfaces show, however, premature wear through, for instance, rutting and cracking of the surface, which respectively occurs at high and low temperatures. Therefore, to be useful an asphalt composition needs to display both a good low temperature performance and a good high temperature performance. Another type of premature wear of road surfaces is the so-called ravelling, which is the progressive dislodgement of aggregate particles at the road surface. This ravelling is brought about by traffic loadings. A key factor which increases ravelling susceptibility over time is the embrittlement of the bituminous binder by means oxidative ageing processes. Ravelling causes a variety of problems. These problems include an increased road noise due to the fact that the road surface becomes rougher in texture, and the risk of vehicle hydroplaning as a result of the reduced drainage capacity of the ravelled road surface. In addition, the separated aggregate particles may cause damage to car glass and thus car accidents. These ravelling problems apply especially to very open graded asphalt compositions.

In view of the above it will be clear that there is a need to develop asphalt compositions with bitumen binders that display an improved resistance against oxidation or ageing resistance, whereas they have at the same time a good high and low temperature performance.

Surprisingly, it has been found that such an improved bituminous binder material can be provided when use is made of a bitumen that includes a particular clay.

Accordingly, the present invention relates to a bitumen composition comprising a bitumen and a modified clay which clay is obtainable by subjecting a clay having a layered structure to a treatment with a compound that is selected from the group consisting of onium compounds having the general formulae $(R_1R_2R_3R_4X)^+$ or $(R_1R_2R_3Y)^+$, wherein X represents N or P, Y represents S, and wherein at least one of $R_1$-$R_4$ represents an aromatic hydrocarbon substituent, a hydroxyl or amino functionalised aliphatic hydrocarbon substituent or a poly(ethyleneoxide) substituent.

It has been found that such a bitumen composition displays an improved ageing resistance when compare to a bitumen composition that does not include the present onium compound, while the high temperature viscosity of the bitumen composition remains within the limits dictated by regular transport and processing conditions. In addition, asphalt compositions prepared from the present bitumen composition display an increased resistance to stripping, i.e. there is less reduction of the bitumen-aggregate contact strength observed which reduction is normally due to the action of water. Moreover, the viscosity properties of the present bitumen composition are such that segregation of bitumen and aggregate during, for instance, transport is reduced.

The aliphatic or aromatic hydrocarbon can be a linear or branched hydrocarbon.

Suitably, $R_1$-$R_4$ jointly share 7-40 carbon atoms. Preferably, $R_1$-$R_4$ jointly share 10-38 carbon atoms.

Each of $R_1$-$R_4$ may optionally comprise one or more functional groups coupled to the hydrocarbon chains. Suitable examples of such functional groups include amino and ammonium groups, aliphatic and aromatic hydroxyl groups.

Preferably, $R_1$-$R_4$ each independently represents a branched hydrocarbon. Preferably, the onium compound to be used in accordance with the present invention comprises two or more different types of substituents $R_1$-$R_4$. Preferably, one or more of $R_1$-$R_4$ substituents comprises poly(ethylenoxide).

In a very attractive embodiment of the present invention, the onium compound comprises at least one aromatic hydrocarbon substituent and at least one aliphatic hydrocarbon substituent, or the onium compound comprises at least one aromatic hydrocarbon substituent and at least one hydroxyl or amino functionalised aliphatic hydrocarbon substituent.

Such preferred onium compounds enable the inclusion of a clay in a bitumen composition without affecting the viscosity of the bitumen composition. In this way, bitumen compositions that contain a clay can advantageously be readily pumped from a bitumen tank, without having to deal with high viscosity related problems.

One or more types of onium compounds can be used to treat the clay. Preferably, use is made of only one particular type of onium compound. Suitable examples of onium compounds to be used in accordance with the present invention include hexadecyltrimethyl ammonium, octadecyltrimethyl ammonium, octadecyl-bis-2-hydroxyethyl methyl ammonium, methyl tallow bis-2-hydroxyethyl ammonium, dimethyl benzyl hydrogenated-tallow ammonium, dimethyl dihydrogenated-tallow ammonium, dimethyl hydrogenated-tallow 2-ethylhexyl ammonium and Tributyl(hexadecyl) phosphonium It will be appreciated that the onium compounds to be used in accordance with the present invention are compatible with the clay.

Preferably, the clay is obtained by subjecting a clay having a layered structure to the treatment with a compound that is selected from the above-mentioned group of onium compounds.

In addition, it is noted that it is surprising that these modified clays can directly be included a bitumen, in view of rather different nature of these two materials. In this respect it is noted that a bituminous material is a usually non-polar organic type of material, whereas a clay is a much more polar inorganic material. Because of this difference the materials are expected to be poorly intermixable. Nonetheless, the bitumen composition according to the present invention can easily and directly be prepared by mixing the bitumen and the modified clay at an elevated temperature.

which compound is compatible with the clay.

In addition to the onium compound a block copolymer or graft copolymer can suitably be used which comprises first structural units which are compatible with the clay, and one or more second structural units which are compatible with the polymeric matrix.

Very suitable are clay types based on layered silicates, such as layered phyllosilicate composed of magnesium and/or aluminium silicate layers which are each about 7-12 Å in thickness. Especially preferred are smectite-like clay minerals, such as montmorillonite, saponite, hectorite, fluorohectorite, beidellite, nontronite, vermiculite, halloysite and stevensite.

These materials impart very favourable mechanical properties and a great heat resistance to a nanocomposite material.

A very suitable type of clay has a cation exchange capacity of from 30 to 250 milliequivalents per 100 gram. When this capacity exceeds the above upper limit, it may prove difficult to finely disperse the clay on a molecular level because of the strong mutual interaction of the clay layers. When the cation exchange capacity is lower than the above lower limit, it may turn out that the clay is hard to modify, owing to the fact that the interaction with the block copolymer or graft copolymer is small. Preferably, use is made of a clay having a cation exchange capacity of from 50 to 200 milliequivalents per 100 gram.

When preparing the modified clay in accordance with the present invention, it is preferred to grind or pulverize the clay before it is subjected to the treatment with any of the above compounds. Such a pre-treatment of the clay results in an easier and better mixability of the compound and the clay.

The clay and the block copolymer or graft copolymer may be brought together in any suitable manner, provided this manner gives a good mixture. Examples of methods of bringing together the clay and said compounds comprise agitation for a longer period of time at elevated temperature and extrusion. Suitable mixing conditions can be easily determined by a skilled worker. The agitation may be carried out, e.g. at a temperature between 40 and 80° C. and the extrusion, e.g. between 40 and 150° C. in a twin-screw extruder.

Preferably, the clay to be subjected to the treatment has a cation exchange capacity (CEC) in the range of from 30 to 250 milliequivalents per 100 gram.

Preferably, the treatment with the onium-compounds is an ion-exchange treatment.

Suitably, the ion exchange treatment is carried out as follows. The clay is swollen in warm water at concentrations between 0.5 and 15% and subsequently mixed under stirring with a solution of the onium compound having a concentration according to the desired CEC. The filtrated material so obtained is then washed for the removal of residual onium compound and salts, and subsequently dried.

The modified clay is suitably present in the bitumen composition according to the invention in an amount of less than 20% by weight, based on total bitumen composition. Preferably, the modified clay is present in an amount of less than 10% by weight, and more preferably in an amount in the range of from 2-6% by weight, based on total bitumen composition. One of the surprising aspects of the present invention is that only a small amount of the modified clay is needed to establish a considerably improved ageing resistance.

The present invention also relates to a process for preparing a bitumen composition in accordance with the present invention, in which a bitumen is mixed at elevated temperature with the modified clay in accordance with the present invention. One of the advantages of the present invention is the fact that the modified clay can directly in dry powder form be mixed with the bitumen. It is, for instance, not necessary to prepare first an emulsion of the modified clay.

In addition, the present invention relates to the use of a bitumen composition according to the present invention in an asphalt composition for road applications. Preferably, the present invention relates to the use of a bitumen in an open-graded asphalt composition, more preferably very open-graded asphalt composition for road applications.

The bitumen components may be naturally occurring bitumens or derived from a mineral oil. Also petroleum pitches obtained by a cracking process and coal tar can be used as well as blends of bituminous materials. Examples of suitable bitumens include distillation or "straight run" bitumens, precipitation bitumens, e.g. propane bitumens, blown bitumens, e.g. catalytically blown bitumens, and mixtures thereof. Other suitable bitumen compositions include mixtures of one or more of these bitumens with extenders (fluxes) such as petroleum extracts, e.g. aromatic extracts, distillates or residues, or with oils.

The asphalt composition prepared in accordance with the present invention is in particular suitable for use in road applications. The asphalt composition prepared in accordance with the present invention can suitably be used in the construction of base coarse materials or wearing coarse materials. The bitumen component of the bitumen composition in accordance with the present invention has suitably a penetration, which varies between 20 to 240 dmm, preferably between 25 to 100 dmm (as measured by ASTM D 5 at 25° C.).

The bitumen component has suitably a softening point in the range of from 35 to 60° C., preferably between 40 to 55° C. (as measured by ASTM D86).

The bitumen composition according to the present invention has suitable a penetration which varies between 20 to 240 dmm, preferably between 25 to 100 dmm (as measured by ASTM D 5 at 25° C.).

The bitumen composition according to the present invention has suitably a softening point in the range of from 35 to 60° C., preferably between 40 to 55° C. (as measured by ASTM D36).

The present invention further relates to an asphalt composition comprising aggregate and a bitumen composition in accordance with the present invention.

The asphalt composition according to the present invention is suitably an open-graded asphalt composition, and preferably a very open-graded asphalt composition. Open-graded asphalt compositions according to the present invention have a void content of more than 10%, and preferably more than 15%, whereas very open-graded asphalt compositions have a void content in the range of from 20 to 30%. Suitable aggregates include those normally applied in open-graded asphalt compositions.

Aggregate is basically rocks and sand. It is mixed with the bitumen composition according to the present invention to form the present asphalt compositions. The asphalt compositions in accordance with the present invention suitably comprise 80-99% by weight of aggregate and 1-20% by weight of the bitumen composition according to the present invention, both based on total asphalt composition. Preferably, the present asphalt compositions comprise 2-10% bitumen composition by weight, based on total asphalt composition.

The bitumen compositions may also contain other ingredients such as fillers, e.g. carbon black, silica and calcium carbonate, stabilisers, antioxidants, pigments and solvents which are known to be useful in bitumen compositions.

The bitumen composition may also contain one of the block copolymers that are usually used to improve the low and high temperature performance of bitumen compositions, in amounts taught in the art.

The asphalt compositions prepared in accordance with the present invention comprise aggregate in amounts taught in the art. The present invention also relates to a process for preparing a bitumen composition according to the present invention comprising mixing a bitumen at elevated temperature with a modified clay which clay is obtainable by subjecting a clay to a treatment with a compound that is selected from the group consisting of onium compounds having the general formulae $(R_1R_2R_3R_4X)^+$ or $(R_1R_2R_3Y)^+$, wherein X represents N or P, Y represents S, and and wherein at least one of $R_1$-$R_4$ represents an aromatic hydrocarbon substituent, a hydroxyl or amino functionalised aliphatic hydrocarbon substituent or a poly(ethyleneoxide) substituent.

In addition, the present invention also relates to the use of a bitumen composition in accordance with the present invention in an asphalt composition for road applications.

The present invention also relates to the use of an asphalt composition according to the invention for constructing an asphalt road.

The present invention further relates to a bitumen emulsion comprising the bitumen composition according to the present invention.

Additionally, the present invention also relates to the use of a bitumen emulsion according to the present invention for constructing an asphalt road.

The present invention further relates to the use of a bitumen emulsion according to the present invention for constructing surface dressings. Said surface dressings can be used for roads, airfields and parking garages end parking lots.

The present invention will now be illustrated by way of the following Examples.

EXAMPLES

A bitumen composition according to the invention was prepared by mixing 70/100 penetration grade bitumen with 6 wt % of a montmorillonite clay (CEC 95 mequiv./100 g, ion exchanged with octadecyl-bis-2-hydroxyethyl methyl ammonium). The clay was slowly added to the hot bitumen under stirring at 120° C. and the mixture was further homogenised by stirring an additional time of 30 minutes. The material so obtained was subjected to a Rotating Thin Film Oven Test (RTFOT), according to ASTM D2872, EN 12607-1. The RTFOT test is considered a measure of the oxidation susceptibility of the bitumen, For reasons of comparison, a standard 70/100 penetration grade bitumen and 20/30 penetration grade bituminen were also subjected to the RTFOT test. The penetration and softening point of the samples were measured before and after the RTFOT test. Penetration was measured according to ASTM standard D5-97. Softening point was measured by the ball and ring method, according to ASTM standard D36-95.

From the experimental data obtained the retained penetration, defined as the ratio of the penetration after and before the RTFOT test, was calculated. Also, the increase in softening point due tot the RTFOT test was calculated. The results of the RTFOT test are shown in Table 1.

TABLE 1

Result of Rotating Thin Film Oven Test

|  | Bitumen 70/100 | Bitumen 70/100 + modifted clay | Bitumen 20/30 |
| --- | --- | --- | --- |
| PEN (dmm) | 95 | 88 | 26 |
| Softening point (° C.) | 44.6 | 46.2 | 56.8 |
| Retained Penetration (%) | 67 | 80 | 69 |
| Increase in softening point (° C.) | 4.2 | 2.2 | 4.0 |
| Viscosity at 135° C. (Pa s) | 0.24 | 0.56 | 0.87 |

Table 1 shows that the retained penetration for the bitumen composition modified according to the present invention is 13% higher than the retained penetration of standard 70/100 bitumen. In addition, the increase in softening point of the bitumen composition modified according to the present invention is 2° C. lower than the increase in softening point of the plain bitumen. This implies that the bitumen composition modified according to the present invention has a higher resistance to changes in bitumen consistency as a result of oxidative ageing than the plain bitumen.

The bitumen composition modified according to the present invention was also subjected to an Immersion test, according to ASTM D3625, EN 13614. In this test, 1.6 grams of the bitumen composition according to the present invention was mixed with 235 grams of porphyry aggregate at 165° C. for 1 minute. Thereafter, the mixture was submerged in water at 100° C., and cooled to room temperature. After the test, the percentage of aggregate that was coated with bitumen after the test was measured. The immersion test is a measure of the resistance of the bitumen to stripping, i.e. debonding of bitumen from aggregate due to the action of water. The results of the Immersion Test are shown in Table 2. In table 2 it can be seen that the percentage of aggregate covered with bitumen after the immersion test is highest for the bitumen composition modified according to the present invention, when compared to plain bitumen. This leads to the conclusion that the bitumen composition modified according to the present invention has a higher susceptibility to stripping than plain bitumen.

TABLE 2

Results of Immersion Test, ASTM D3625/EN 13614

|  | Bitumen 70/100 | Bitumen 70/100 + modified clay | Bitumen 20/30 |
| --- | --- | --- | --- |
| % of covered aggregate after immersion test | 25 | 40 | 20 |

The invention claimed is:

1. An open graded asphalt composition having a void content of more than 10%, said composition comprising aggregate and a bitumen composition comprising a bitumen and a modified clay which clay is obtainable by subjecting a clay having a layered structure to a treatment with a compound that is selected from the group consisting of onium compounds having the general formulae $(R_1R_2R_3R_4X)^+$ or $(R_1R_2R_3Y)^+$, wherein X represents N or P, Y represents S, and wherein at least one of $R_1$-$R_4$ represents an aromatic hydrocarbon substituent, a hydroxyl or amino functionalized aliphatic hydrocarbon substituent or a poly(ethyleneoxide) substituent.

2. An open graded asphalt composition according to claim 1, wherein $R_1$-$R_4$ jointly share 7-40 carbon atoms.

3. An open graded asphalt composition according to claim 2, wherein $R_1$-$R_4$ jointly share 10-38 carbon atoms.

4. An open graded asphalt composition according to claim 1, wherein the onium compound comprises two or more different types of substituents $R_1$-$R_4$.

5. An open graded asphalt composition according to claim 1, wherein the onium compound comprises at least one aromatic hydrocarbon substituent and at least one aliphatic hydrocarbon substituent, or the onium compound comprises at least one aromatic hydrocarbon substituent and at least one hydroxyl or amino functionalized aliphatic hydrocarbon substituent.

6. An open graded asphalt composition according to claim 1, wherein one or more of the substituents $R_1$-$R_4$ comprises poly(ethyleneoxide).

7. An open graded asphalt composition according to claim 1, wherein one or more types of onium compounds are used to treat the clay.

8. An open graded asphalt composition according to claim 1, wherein the clay has a cation exchange capacity in the range of from 30 to 250 milliequivalents per 100 gram.

9. An open graded asphalt composition according to claim 1, wherein the clay is a smectitie-like clay.

10. An open graded asphalt composition according to claim 9, wherein the clay is selected from the group consisting of montmorillonite, saponite. hectoraite, fluorohectorite, beidellite, nontronite, vermiculite, halloysite and stevensite.

11. An open graded asphalt composition according to claim 1, wherein the treatment is an ion-exchange treatment.

12. An open graded asphalt composition according to claim 1, wherein the clay is present in an amount of less than 20% by weight, based on total bitumen composition.

13. An open graded asphalt composition according to claim 12, wherein the clay is present in an amount of less than 10% by weight, based on total bitumen composition.

14. An open graded asphalt composition according to claim 13, wherein the clay is present in an amount in the range of from 2-6% by weight, based on total bitumen composition.

15. An open graded asphalt composition according to claim 1, wherein the bitumen has a penetration in the range of from 20 to 240 dmm (as measured by ASTM D5 at 25° C.) and a softening point in the range of from 35 to 60° C. (as measured by ASTM D36).

16. An open graded asphalt composition according to claim 1, having a void content of more than 15%.

17. An open graded asphalt composition according to claim 16, having a void content in the range of 20 to 30%.

18. An open graded asphalt composition according to claim 1, wherein the aggregate is rocks and sand.

19. An open graded asphalt composition according to claim 1, comprising 80-99% by weight of aggregate and 1-20% by weight of the bitumen composition, both based on total asphalt composition.

20. An open graded asphalt composition according to claim 1, comprising 2-10% bitumen composition by weight, based on total asphalt composition.

21. A process for increasing the oxidative ageing resistance of an open graded asphalt composition having a void content of more than 10% comprising aggregate and bitumen to which has been added a modified clay which clay is obtainable by subjecting a clay having a layered structure to a treatment with a compound that is selected from the group consisting of onium compounds having the general formulae $(R_1R_2R_3R_4X)^+$ or $(R_1R_2R_3Y)^+$, wherein X represents N or P, Y represents S, and wherein at least one of $R_1$-$R_4$ represents an aromatic hydrocarbon substituent, a hydroxyl or amino functionalized aliphatic hydrocarbon substituent or a poly (ethyleneoxide) substituent.

22. A process according to claim 21, wherein the asphalt composition has a void content of more than 15%.

23. A process according to claim 21, wherein the asphalt composition has a void content in the range of 20-30%.

* * * * *